W. A. HIRSCH.
EXPANDING METAL CORE.
APPLICATION FILED DEC. 7, 1917.
1,276,654.
Patented Aug. 20, 1918.
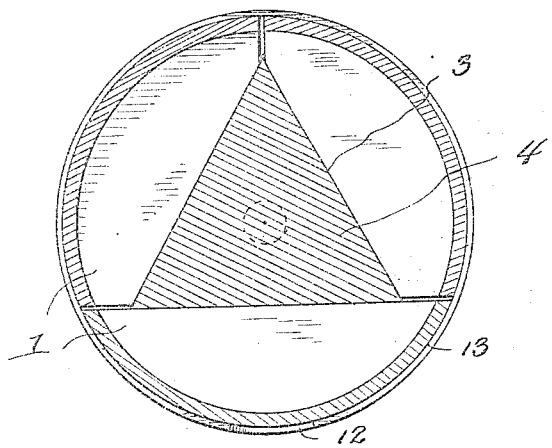
Fig. 1.
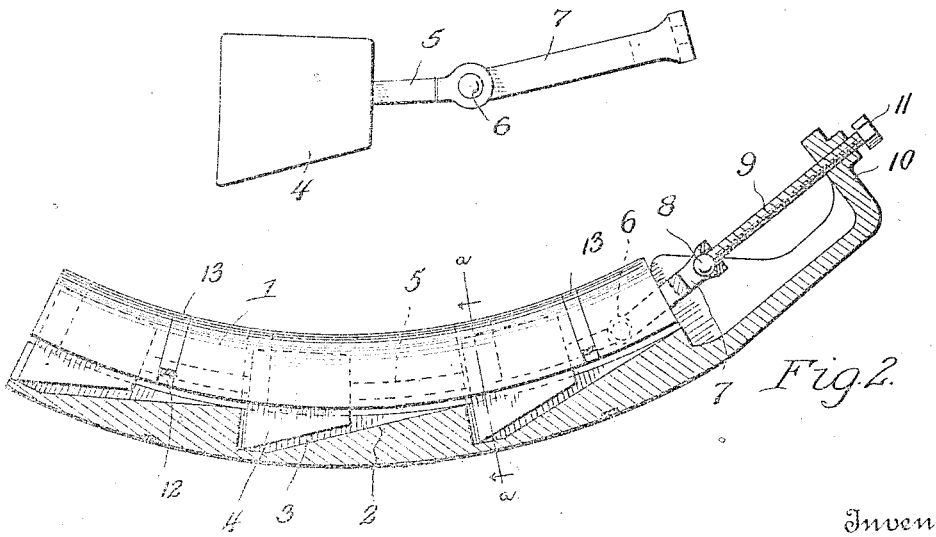
Fig. 3.
Fig. 2.
Inventor
W. A. Hirsch.
Witnesses
By Victor J. Evans
Attorney
Thos. B. Roscow.

UNITED STATES PATENT OFFICE.

WILLIAM A. HIRSCH, OF AVALON, PENNSYLVANIA.

EXPANDING METAL CORE.

1,276,654.

Specification of Letters Patent.

Patented Aug. 20, 1918.

Application filed December 7, 1917. Serial No. 206,086.

*To all whom it may concern:*

Be it known that I, WILLIAM A. HIRSCH, a citizen of the United States, residing at Avalon, in the county of Allegheny and State of Pennsylvania, have invented new and useful Improvements in Expanding Metal Cores, of which the following is a specification.

This invention relates to an expandible core and has for its primary object to provide a core capable of expanding a tire when vulcanizing the latter.

An object of the invention is to provide a substantial article of few parts capable of exerting great pressure.

Besides the above my invention is distinguished in the use of elements so constructed and associated that great pressure may be created by the use of inclined surfaces and a screw.

With these and other objects in view the invention will be better understood from the following detailed description taken in connection with the accompanying drawing wherein:

Figure 1 is a cross sectional view of the line *a—a* of Fig. 2.

Fig. 2 is a side elevation of the device with one of the members in section.

Fig. 3 is a detailed view of one of the blocks.

My invention in one of its forms consists of a plurality of members 1 shown in this particular instance with the outer surface shaped to form a circle but I wish it to be understood that the outline of the members may be changed to conform to any shape found necessary. Each member is provided with a series of inclined faces 2 with which coöperates the inclined surfaces 3 of blocks 4. These blocks have passed therethrough or connected thereto in any suitable manner a rod 5 one end of which being perforated to receive a pin 6 that connects the same to a link 7 that in turn has a ball and socket connection 8 with one end of a screw 9. This screw 9 is threaded in an end portion 10 of one of the members with the head 11 thereof disposed to be engaged by a suitable tool.

As far as I have proceeded it will be seen that upon rotating the screw 9 the blocks will be moved to a position to create great pressure between the surfaces of the blocks and the faces 2 with the result that all of the members are pressed in a lateral direction or in a radial direction as illustrated in the drawing.

If found advantageous in practice the members may be recessed as indicated at 12 and spring rings 13 inserted therein for the purpose of contracting and properly associating the members while at the same time allowing the same to readily expand. Should it become advisable in practice the entire device may be inclosed in a casing of resilient material so that all corners and cracks will be completely covered although when expanding a tire casing this will not be necessary.

From the foregoing description taken in connection with the drawing it should be apparent that I provide a device admirably adapted for the purposes intended and that may be manufactured and sold at a comparatively low cost and in which the parts are so shaped and associated that great pressure can be created.

Having described my invention what I claim is:

An expanding core comprising a plurality of arcuate members, a plurality of blocks each having a cam action with the members, an arcuate rod connecting the blocks together, a link pivotally connected to one end of the rod and a screw having a screw threaded engagement with one of the members and a ball and socket connection with said link for the purpose set forth.

In testimony whereof I affix my signature.

WILLIAM A. HIRSCH.